Feb. 6, 1968   D. SCARAMUCCI   3,367,624
VALVE FOR USE BETWEEN RING-JOINT FLANGES
Filed June 4, 1965   4 Sheets-Sheet 1
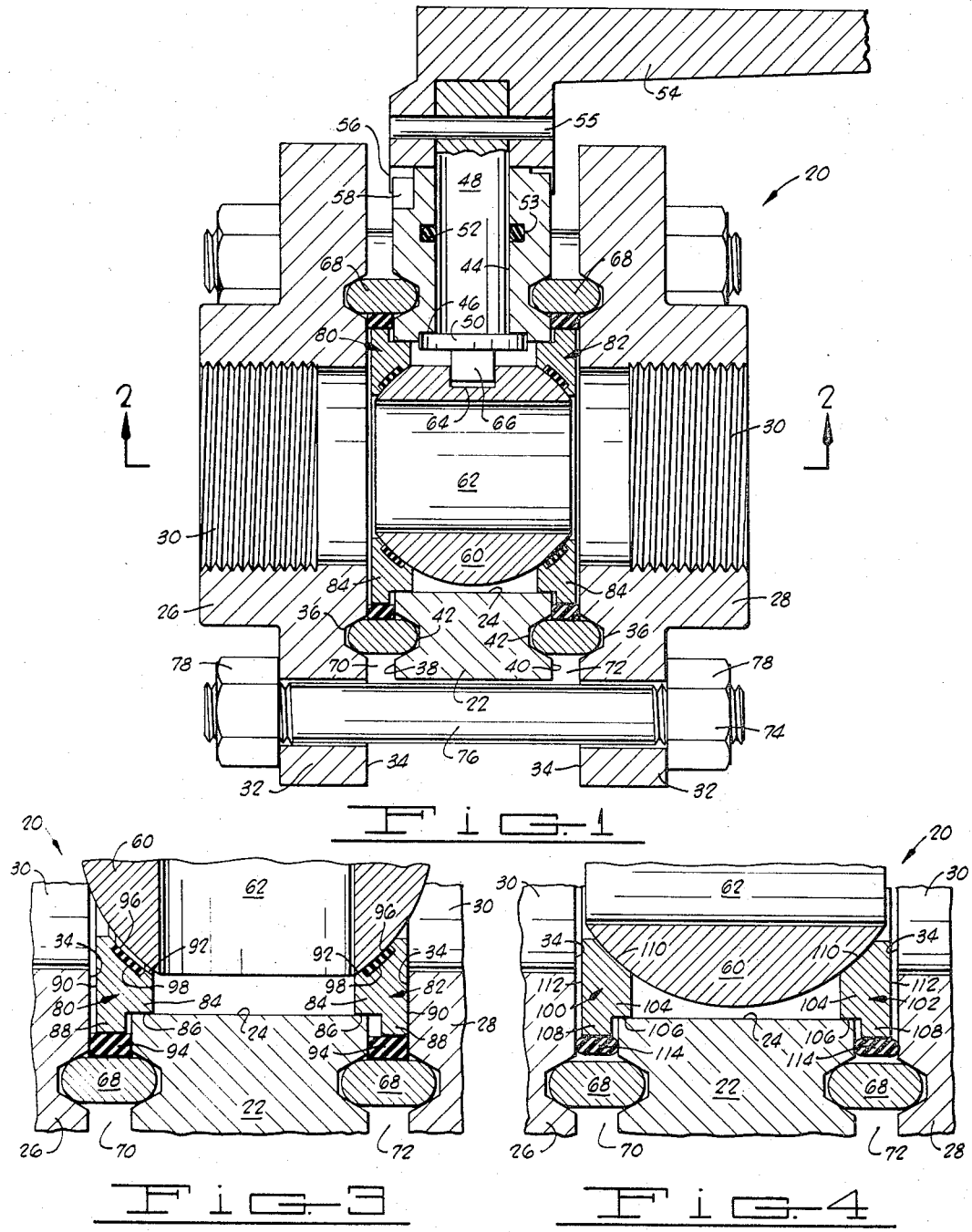
INVENTOR.
DOMER SCARAMUCCI
BY
Dunlap and Laney
ATTORNEYS Feb. 6, 1968     D. SCARAMUCCI     3,367,624
VALVE FOR USE BETWEEN RING-JOINT FLANGES
Filed June 4, 1965     4 Sheets-Sheet 2
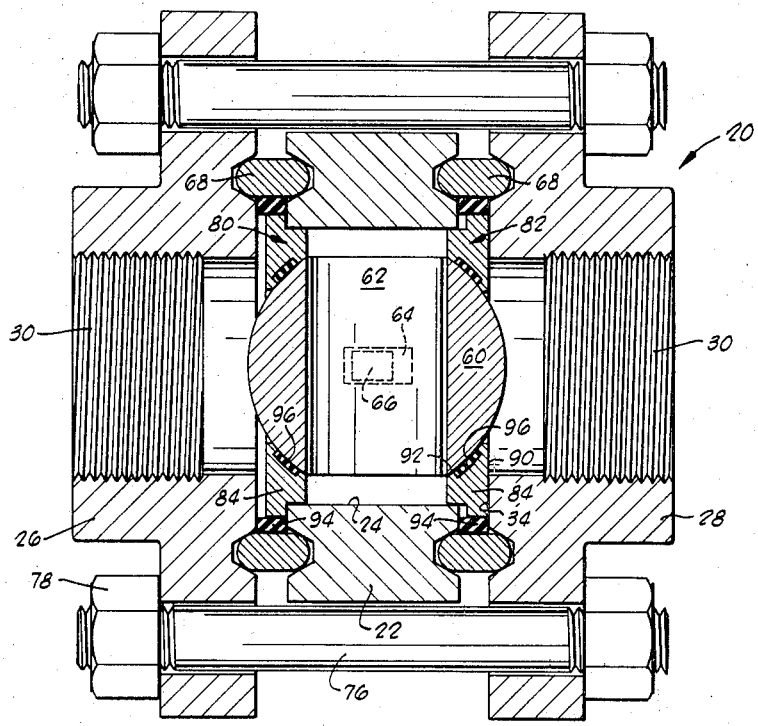
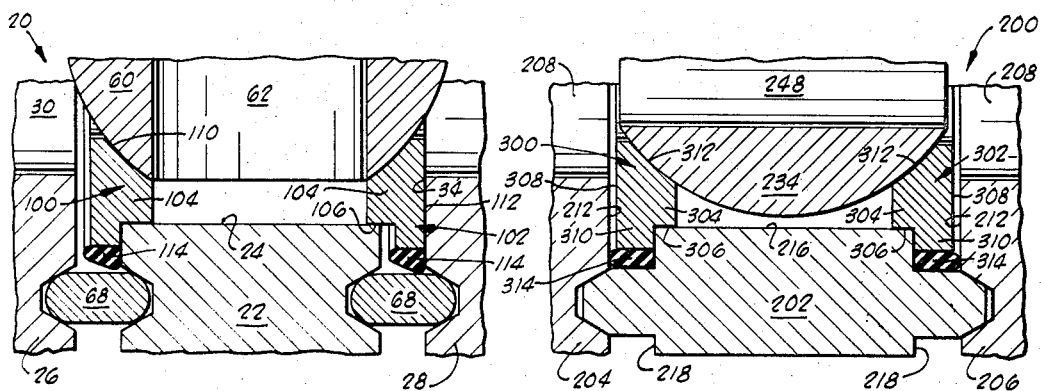
INVENTOR.
DOMER SCARAMUCCI
BY
*Dunlap and Laney*
ATTORNEYS

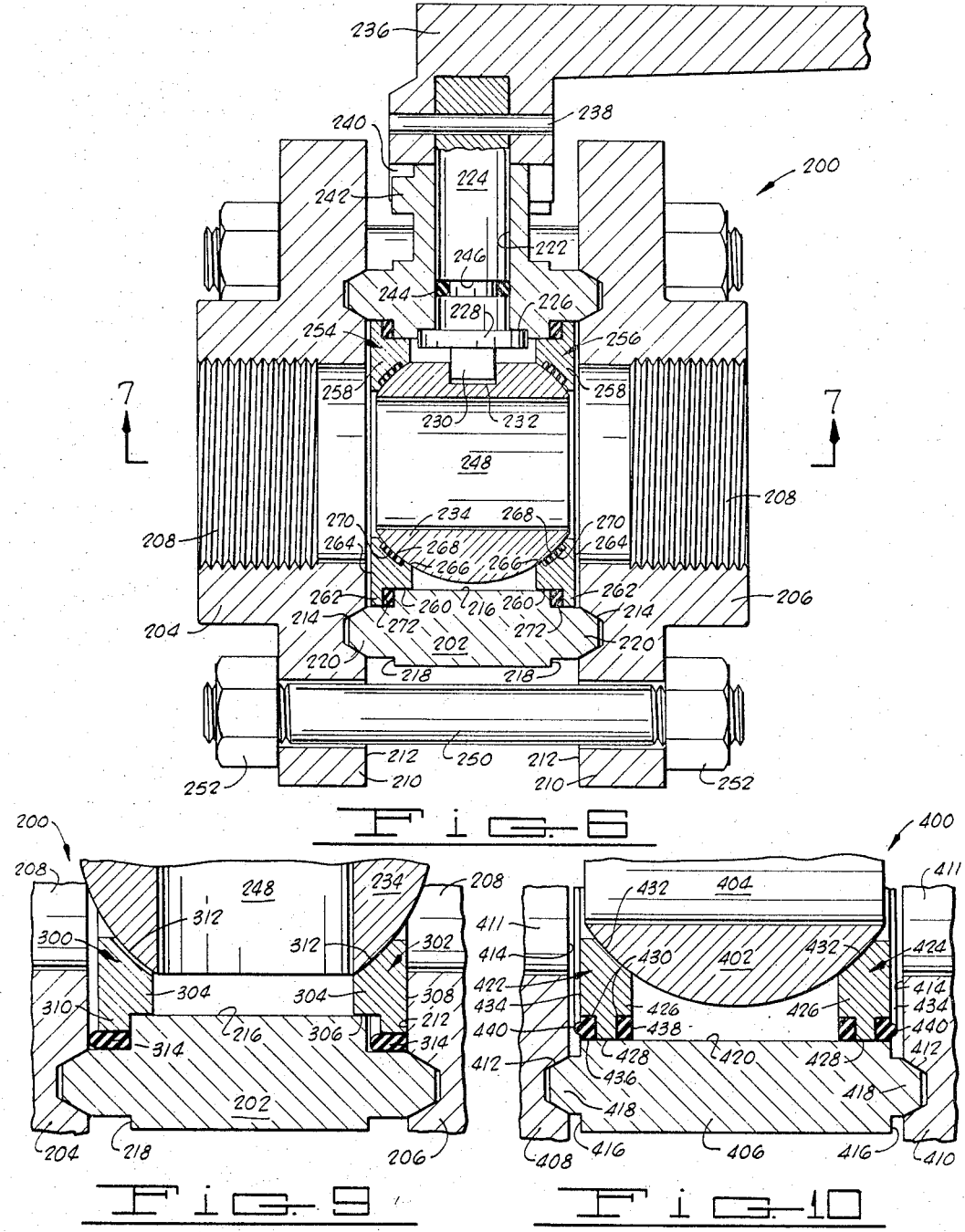

Feb. 6, 1968

D. SCARAMUCCI 3,367,624

VALVE FOR USE BETWEEN RING-JOINT FLANGES

Filed June 4, 1965

INVENTOR.
DOMER SCARAMUCCI
BY
Dunlap and Laney
ATTORNEYS

United States Patent Office 3,367,624
Patented Feb. 6, 1968

3,367,624
VALVE FOR USE BETWEEN RING-JOINT
FLANGES
Domer Scaramucci, 3245 S. Hattie, Oklahoma City,
Okla. 73129
Filed June 4, 1965, Ser. No. 461,334
14 Claims. (Cl. 251—148)

ABSTRACT OF THE DISCLOSURE

A spherical ball valve assembly for use between a pair of flanged connecting members each of which has an annular groove in the face thereof. The valve assembly and flanged members are positioned and maintained in spaced relation by rigid annular members which sealingly engage the annular grooves. Seating ring means are provided to slidingly and sealingly engage the valve body.

---

This invention relates generally to improved valves arranged to be mounted in a fluid circuit between a pair of ring-joint flanges. More particularly, but not by way of limitation, this invention relates to an improved valve including a valve body having means thereon adapted to sealingly engage the ring-joint flanges used to connect the valve in the fluid circuit.

It is common industry practice to join adjacent ends of conduits by the use of fittings known as "ring-joint flanges." A ring-joint flange is generally connected to an adjacent section of conduit by either threading or welding. The end face of a ring-joint flange is provided with an annular groove encircling a passageway extending therethrough that is in fluid communication with the interior of the conduit to which the flange is connected. To provide a fluid-tight connection between adjacent ring-joint flanges, the annular grooves in the end faces are aligned and a relatively rigid, annular seal is positioned in the aligned annular grooves. A plurality of threaded fasteners, such as bolts or studs, connect the flanges. Tightening the threaded fasteners moves the flanges relatively toward each other, thereby exerting a compressing force on the seal. Generally, the seal is sized so that, even under the compressive load exerted by the threaded fasteners, a small gap or space is present between adjacent end faces of the ring-joint flanges.

Valves have been constructed in the past for use between ring-joint flanges. However, such valves have included, on each end of the valve body, a mating flange whereby the valves are joined first to the flange on one end of one conduit and independently to the flange located on the end of the other conduit. The provision of a flange on each end of the valve body has resulted in valves of this type being extremely heavy and, consequently, relatively expensive. It should also be pointed out that in the previously constructed valves for use between flanges there is no cooperative relationship between the flanges located on the ends of the sections of conduit and the internal structure of the valve, that is, the only purpose of the ring-joint flanges is for connecting the valve in the conduit.

This invention provides an improved valve for use between a pair of flanged connecting members, that is between a pair of ring-joint flanges, that includes a valve body having a pair of end faces arranged to sealingly engage the flanged connecting members, a valve member movably disposed in the valve body, and sealing means disposed in the valve that cooperates with the valve body, connecting members, and valve member to form a fluid-tight seal when the valve member is in a position closing the valve.

One object of the invention is to provide an improved valve that can be quickly and relatively inexpensively manufactured.

Another object of the invention is to provide an improved valve that can be quickly and easily removed for maintenance and repair from the fluid circuit in which it is installed.

A further object of the invention is to provide an improved valve that can be installed in a relatively small space as compared to previously constructed, flange-mounted valves.

An additional object of the invention is to provide an improved valve for use between ring-joint flanges wherein a portion of the valve body is utilized to form a fluid-tight connection between the valve body and ring-joint flanges.

Still another object of the invention is to provide an improved valve for use between ring-joint flanges that utilizes standard ring-joint seals for forming a fluid-tight connection between the ring-joint flanges and the valve body.

The foregoing and additional objects and advantages of the invention will become more apparent as the following detailed description is read in conjunction with the accompanying drawings wherein like reference characters denote like parts in all views and wherein:

FIG. 1 is a vertical cross-sectional view of a valve constructed in accordance with the invention;

FIG. 2 is a horizontal cross-sectional view of the valve of FIG. 1 taken substantially along the line 2—2 of FIG. 1 and showing the valve member in a different operating position;

FIG. 3 is an enlarged, fragmentary cross-sectional view of the valve of FIG. 1 illustrating the parts therein in still another operating position;

FIG. 4 is a fragmentary cross-sectional view illustrating another embodiment of seal utilized in the valve of FIG. 1;

FIG. 5 is also a fragmentary cross-sectional view illustrating the seal structure shown in FIG. 4 in another operating position;

FIG. 6 is a vertical cross-sectional view of another embodiment of valve, also constructed in accordance with the invention;

FIG. 8 is an enlarged, fragmentary cross-sectional view illustrating another embodiment of seal located in the valve of FIG. 6;

FIG. 9 is a view similar to FIG. 8 but illustrating the parts thereof in another operating position;

FIG. 10 is an enlarged, fragmentary cross-sectional view illustrating another embodiment of seal installed in the valve of FIG. 6.

Embodiment of FIG. 1

Figure 7:
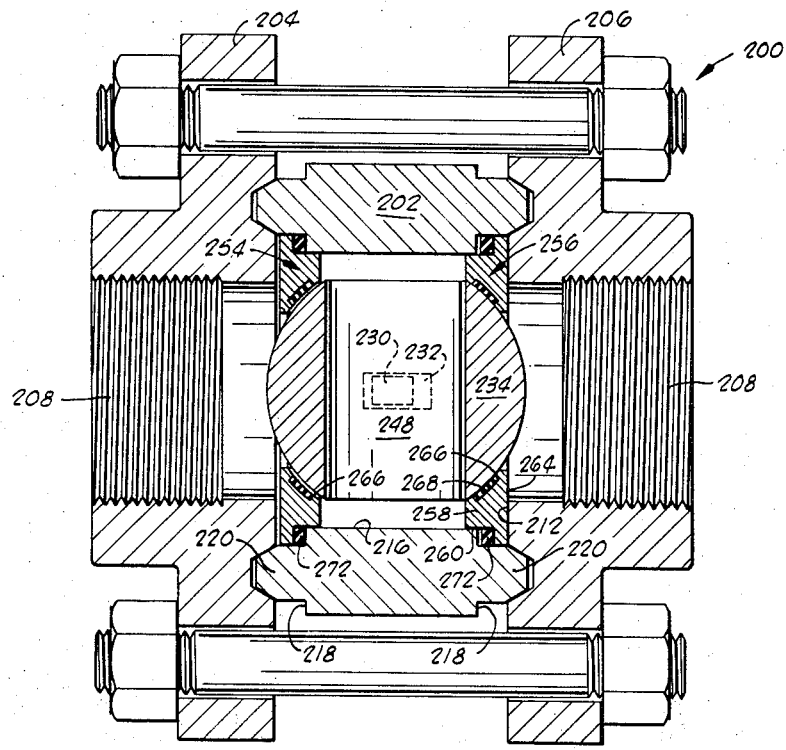
FIG. 7 is a horizontal cross-sectional view of the valve of FIG. 6 taken substantially along the line 7—7 of FIG. 6 and illustrating the valve member in another operating position.

Referring to the drawing, and to FIG. 1 in particular, shown therein and generally designated by the reference character 20 is a valve constructed in accordance with the invention. The valve 20 includes a valve body 22 having a passageway 24 extending therethrough. The valve body 22 is illustrated as being disposed between an upstream connecting member 26 and a downstream connecting member 28. The upstream and downstream connecting members 26 and 28, respectively, are commonly referred to as ring-joint flanges.

As may be perceived in FIG. 1, the connecting members 26 and 28 are identically constructed though oppositely disposed when assembled with the valve 20. Each of the connecting members 26 and 28 includes a partially threaded opening 30 extending therethrough arranged to be axially aligned with the passageway 24 in the valve body 22. Each of the connecting members 26 and 28 also includes a peripheral flange 32 and an end face 34. Each of the end faces 34 includes an annular groove 36 that encircles the opening 30.

In addition to the passageway 24, the valve body 22 also includes an upstream end face 38 and a downstream end face 40. Each of the end faces 38 and 40 includes an annular groove 42 that encircles the passageway 24. The annular grooves 42 are arranged so that they will be aligned with the annular grooves 36 in the end faces 34 of the connecting members 26 and 28 when the connecting members 26 and 28 are assembled with the valve body 22.

A transverse opening 44 extends through the valve body 22 in a direction generally perpendicular to the passageway 24. The transverse opening 44 is spot-faced at its lower end to provide a downwardly facing shoulder 46 adjacent the passageway 24.

A valve operating member 48 extends through the transverse opening 44 and has an exterior flange 50 on its lower end portion that engages the downwardly facing shoulder 46 in the valve body 22 to limit the upward movement of the operating member 48 therein. An O-ring seal 52 is disposed in a recess 53 in the valve body 22 encircling the transverse opening 44 and in sealing engagement with the valve body 22 and with the valve operating member 48. The upper end of the valve operating member 48 extends from the valve body 22 and is connected with an operating handle 54 by a pin 55.

As illustrated in FIG. 1, the operating handle 54 includes one or more lugs 56 that are arranged to engage abutments 58 on the valve body 22 to limit the rotational movement of the handle to approximately 90°.

A valve ball 60 having a port 62 extending therethrough is movably disposed in the passageway 24. A rectangular recess 64, formed in the exterior surface of the valve ball 60, is sized to receive a rectangular end 66 on the valve operating member 48. As shown most clearly in dash lines in FIG. 2, the rectangular recess 64 is considerably larger in one dimension than the rectangular end 66 on the valve operating member 48 to permit movement of the valve ball 60 along the passageway 24 for purposes that will be described more fully hereinafter.

A pair of seal members 68 that are generally constructed from a relatively rigid material are located in the valve 20. The seal members 68 may be standard ring-joint seals sold for the purpose of forming a fluid-tight seal between ring-joint flanges.

One of the seal members 68 is disposed in the adjacent and aligned annular grooves 36 and 42 located in the upstream connecting member 26 and the upstream end face 38 of the valve body 22, respectively. The other seal member 68 is disposed in the adjacent and aligned grooves 36 and 42 formed in the downstream connecting member 28 and in the downstream end face 40 of the valve body 22, respectively. The seal members 68 are sized to sealingly engage the adjacent valve body 22 and the respective connecting member 26 and 28. They are of sufficient width to form a space 70 between the upstream connecting member 28 and the valve body 22 and a space 72 between the downstream end face 40 of the valve body 22 and the downstream connecting member 28 when disposed in the described annular grooves.

The valve 20, that is, the valve body 22, the upstream connecting member 26, the downstream connecting member 28, and the seal members 68 are held in assembled, fluid-tight relationship by a plurality of threaded fasteners 74 that extend between and through the peripheral flanges 32 on the connecting members 26 and 28. As illustrated, the threaded fasteners 74 each includes a rod member 76 that is threaded on each end to receive a threaded nut 78. It can be observed in FIG. 1 that tightening the thread nuts 78 on the rod member 76, moves the connecting flanges 26 and 28 into tight engagement with the seal members 68 which, as previously described, are also in engagement with the valve body 22.

An annular upstream seal 80 is positioned in the valve 20 encircling the opening 30 in the upstream connecting member 26. An identical, though oppositely disposed, annular downstream seal 82 is positioned in the valve 20 encircling the opening 30 in the downstream connecting member 28. The structure of the seals 80 and 82 are believed most clearly shown in FIG. 3 and, therefore, reference is made to FIG. 3 for the structural description of the seals.

As shown in FIG. 3, each of the seals 80 and 82 includes a seating ring 84 that is preferably constructed from a relatively rigid material. The seating ring 82 has an outer periphery 86 sized to be slidingly received in the passageway 24 in the valve body 22. A peripheral flange 88 on each of the seating rings 84 extends radially outwardly into a respective space 70 or 72 formed between the upstream connecting member 26 and the valve body 22 and between the downstream connecting member 28 and the valve body 22. The seating rings 84 also include a surface 90 that faces generally away from the valve body 22 and is arranged to abut the end face 34 of the adjacent connecting member 26 or 28. A surface 92 on each of the seating rings 84 is configured to conform to the exterior of the valve ball 60 to form a fluid-tight seal when engaged therewith.

A resilient sealing ring 94 is bonded to the peripheral flange 88 of each of the seating rings 84. Each of the sealing rings 94 is, therefore, disposed in one of the spaces 70 or 72. As illustrated in FIGS. 1 and 3, the sealing rings 94 are sized so that they are in fluid-tight engagement with the adjacent connecting member 26 or 28 and with the valve body 22. Also, the sealing rings 94 are in engagement with the seal members 68. The sealing rings 94 are preferably constructed from a relatively soft and resilient material, such as natural or synthetic rubber.

A resilient annular seal 96 is disposed in a recess 98 formed in the surface 92 of each of the seating rings 84 and is bonded to the seating rings 84 so that the annular seals 96 will, upon engagement with the exterior surface of the valve ball 60, form a fluid-tight seal therewith. The annular seals 96 are also preferably constructed from a resilient and elastic material, such as natural or synthetic rubber.

*Operation of the embodiment of FIG. 1*

FIG. 1 illustrates the valve 20 in the open position, that is, in the position wherein the port 62 in the valve ball 60 is aligned with the openings 30 in the upstream and downstream connecting members 26 and 28, respectively, thereby forming a flow passageway that extends through the valve 20. To close the valve 20, the operating handle 54 is rotated approximately 90°, rotating the operating member 48 and the valve ball 60 therewith. After the valve ball 60 has been rotated 90°, it is in a closed position substantially as illustrated in FIG. 2.

Fluid pressure in the opening 30 in the upstream connecting member 26 exerts a force on the valve ball 60 moving it toward the downstream connecting member 28 and carrying the annular downstream seal 82 therewith until the surface 90 on the annular downstream seal 82 engages the end face 34 of the downstream connecting member 28. When this occurs, the movement of the valve ball 60 and the annular downstream seal 82 is arrested and the valve ball 60 is held in fluid-tight engagement with the annular seal 96 located in the surface 92 of the annular downstream seal 82 by fluid pressure. As the valve ball 60 moves downstream, that is, toward the downstream connecting member 28, the annular seal 96 on the annular upstream seal 80 remains in sealing engagement with the valve ball 60 due to the influence of fluid pressure in the opening 30 of the upstream connecting member 26.

As can be appreciated by comparing FIGS. 1 and 2, the seating rings 84 on each of the seals 80 and 82 slides in the passageway 24 of the valve body 22 so that the seals 80 and 82 can follow the movement of the valve ball 60. Thus, it can be seen that a fluid-tight upstream seal and a fluid-tight downstream seal is formed between the seals 80 and 82, respectively, and the valve ball 60.

Fluid cannot pass between the seating rings 84 and the sealing rings 94 of the seals 80 and 82 due to the bond therebetween. Fluid cannot flow around the exterior of the sealing rings 94 due to the sealing engagement between the sealing rings 94 and the connecting members 26 and 28 and the valve body 22.

It should also be pointed out that the movement of the valve ball 60 is possible due to the relative dimensions of the rectangular recess 64 formed in the surface of the valve ball 60 and the rectangular end 66 of the valve operating member 48, as shown most clearly in dash lines in FIG. 2.

Frequently, the valve 20 is subjected to an increase in temperature, ambient or otherwise, while in the closed position, resulting in a considerable rise in the pressure of fluid trapped within the port 62 and the passageway 24 in the valve body 22. As illustrated in FIG. 3, the valve 20 incorporates a feature that permits the release of such increased pressure into the opening 30 of the upstream connecting member 26.

As shown therein, the fluid pressure in the passageway 24 has increased until it is greater than the pressure in the opening 30 of the upstream connecting member 26, resulting in the seating ring 84 on the annular upstream seal 80 being displaced relatively toward the upstream connecting member 26 and away from the surface of the valve ball 60. The space formed between the valve ball 60 and upstream seal 80 permits the escape of fluid from the passageway 24 into the opening 30 of the upstream connecting member 26. It can be appreciated that the valve ball 60 remains in sealing engagement with the annular downstream seal 82, maintaining closure of the valve 20 and, yet, releases the increased pressure within the valve body 22 to avoid damage to the valve 20.

*Embodiment of FIG. 4*

FIG. 4 illustrates another embodiment of seal that may be utilized in the valve 20. As shown therein, an annular upstream seal 100 and an identical, though oppositely disposed, downstream seal 102 are located in the valve 20.

The seals 100 and 102 each include a seating ring 104 having an outer periphery 106 sized for sliding movement in the passageway 24 of the valve body 22. A peripheral flange 108 extends from the outer periphery 106 of the seating rings 104 and projects radially into the respective space 60 and 72 formed between the upstream connecting members 26 and 28 and the valve body 22.

Each of the seating rings 104 also includes a surface 110 configured to conform to the exterior of the valve ball 60 and to form a fluid-tight seal therewith. The seating rings 104 also include a surface 112 adapted to engage the adjacent end face 34 of either the upstream or downstream connecting member 26 or 28, respectively.

A resilient sealing ring 14 is bonded to the peripheral flange 108 on each of the seating rings 104 and is preferably formed from a resilient and elastic material, such as natural or synthetic rubber. It should be pointed out that the sealing rings 114 are of sufficient size so that they will engage the valve body 22 and the respective connecting member 26 or 28 when the valve 20 is assembled. However, it is not necessary that they be in fluid-tight engagement therewith since the seal members 68 provide a fluid-tight seal between the valve body 22 and each of the connecting members 26 and 28. It should also be pointed out that the seals 100 and 102, as illustrated, do not include an elastic seal member in the surface 10, but it should be understood that elastic annular seal members such as the seal members 96 of FIG. 3 may be incorporated therein if desired.

*Operation of the embodiment of FIG. 4*

As shown in FIG. 4, the valve ball 60 is in the open position, that is, the port 62 is in alignment with the openings 30 of the upstream and downstream connecting members 26 and 28, respectively. To close the valve 20 with the seals 100 and 102 positioned therein, it should be understood that the handle 54 (see FIG. 1) is rotated as described in connection with FIG. 1, rotating the valve ball 60 to the position shown in FIG. 5.

As illustrated in FIG. 5, the valve ball 60 has been shifted toward the downstream connecting member 28 by fluid pressure in the opening 30 of the upstream connecting member 26. The downstream movement of the valve ball 60 continues until the surface 112 on the downstream seal 102 engages the end face 34 of the downstream connecting member 28. As can be observed in FIG. 5, the sealing ring 114 bonded to the downstream seal 102 has moved to the right, pressing the sealing ring 114 into tighter engagement with the end face 34 of the downstream connecting member 28. As the downstream seal 102 moves with the valve ball 60, the outer periphery 106 on the seating ring 104 slides in the passageway 24 of the valve body 22 as described in connection with the seals 80 and 82 of FIG. 1. As can be perceived in FIG. 5, the sealing ring 114 on the downstream seal 102 has moved out of engagement with the valve body 22. As previously mentioned, a fluid-tight seal is formed between the valve body 22 and the seal member 68 so that it is not necessary that the sealing ring 114 be in fluid tight engagement with the valve body 22.

The upstream seal 100 has also moved in the passageway 24 of the valve body 22 so that the sealing ring 114 on the upstream seal 100 is pressed into tighter engagement with the valve body 22, thereby preventing the flow of fluid from the opening 30 in the upstream connecting member 26 into the passageway 24. The surface 110 on the upstream seal 100 remains in sealing engagement with the exterior of the valve ball 60 due to the influence of pressure in the opening 30 in the upstream connecting member 26. Thus, it can be appreciated that the seals 100 and 102 form fluid-tight upstream and downstream seals with the valve ball 60, respectively.

If a fluid pressure increase should occur in the port 62 of the valve ball 60 or in the passageway 24 of the valve body 22, the upstream seal 100 will be displaced relatively toward the upstream connecting member 26 to release the pressure into the opening 30 as described in connection with FIG. 3.

*Embodiment of FIG. 6*

FIG. 6 illustrates another embodiment of ball valve, generally designated by the reference character 200, and also constructed in accordance with the invention. As shown therein, the ball valve 200 includes a valve body 202 disposed between an upstream connecting member 204 and a downstream connecting member 206. The connecting members 204 and 206 are identical in structure though oppositely disposed when assembled with the valve body 202.

Each of the connecting members 204 and 206 includes a partially threaded opening 208 extending therethrough, a peripheral flange 210 and an end face 212. An annular groove 214 is located in each of the end faces 212 encircling the threaded openings 208.

The valve body 202 includes a passageway 216 extending therethrough and arranged to be aligned with the openings 208 when the valve body 202 is assembled with the connecting members 204 and 206. The valve body 202 also includes a pair of end faces 218, and an annular flange 220 on each of the end faces 218. The annular flange 220 encircles the passageway 216 and projects from the end faces 218 axially with respect to the passageway 216 and into the annular grooves 214 formed in the connecting members 204 and 206.

A transverse opening 222 extends through the valve body 202 to receive a valve operating member 224. The lower end of the transverse opening 222 is spot-faced to provide a downwardly facing surface 226 arranged to engage an exterior flange 228 on the valve operating member 224, thereby limiting the upward movement of the valve operating member 224 relative to the valve body 202.

A rectangular lower end 230 on the valve operating member 224 extends into a rectangular recess 232 formed in a valve ball 234 that is movably positioned in the passageway 216 in the valve body 202. The relative sizes of the rectangular lower end 230 and the rectangular recess 232 are clearly shown in dash lines in FIG. 7.

The upper end of the valve operating member 224 is connected with an operating handle 236 by a pin 238. The operating handle 236 includes one or more projecting lugs 240 that are arranged to engage abutments 242 on the valve body 202 to limit the rotation of the operating handle 236, the attached valve operating member 224 and valve ball 234 to approximately 90°.

An O-ring seal 244 is disposed in a groove 246 in the valve operating member 224 forming a fluid-tight seal between the valve operating member 224 and the valve body 202. The O-ring seal 244 is provided to prevent the escape of fluid from the passageway 216 through the transverse opening 222 between the valve body 202 and the valve operating member 224.

The valve ball 234 is rotatable in the passageway 216 and includes a port 248 that extends therethrough. The port 248 is arranged, when in the open position of the valve 200, to be aligned with the openings 208 in the connecting members 204 and 206 as illustrated in FIG. 6. As will be described more fully hereinafter, the valve ball 234 is also moveable in a direction along the passageway 216.

A plurality of threaded fasteners 250 extend between and through the peripheral flanges 210 of the connecting members 204 and 206 to retain the connecting members 204 and 206 assembled with the valve body 202. The threaded fasteners 250 are threaded at each end to receive threaded nuts 252. The threaded nuts 252 are tightened to force the connecting members 204 and 206, that is, the annular grooves 214 therein into sealing engagement with the annular flanges 220 on the valve body 202, thus preventing the escape of fluid from the ball valve 200 between the valve body 202 and the connecting members 204 and 206.

The ball valve 200 also includes an annular upstream seal 254 and an identical, though oppositely disposed, annular downstream seal 256. Each of the seals 254 and 256 include a seating ring 258 that is preferably constructed from a relatively rigid material.

Each of the seating rings 258 includes an outer periphery 260 sized to be slidably received in the passageway 216. A peripheral flange 262 projects radially from the outer periphery 260 of each of the seating rings 258 into one of the spaces formed between the end faces 218 of the valve body 202 and the end faces 212 formed on the connecting members 204 and 206. Each of the seating rings 258 also includes a surface 264 that is adapted to engage the end face 212 of the adjacent connecting member 204 or 206. A surface 266 on each of the seating rings 258 is configured to conform to the exterior surface of the valve ball 234. An elastic annular seal member 268 is disposed in and bonded to a groove 270 formed in each of the surfaces 266 and is arranged to sealingly engage the exterior surface of the valve ball 234.

A resilient and elastic sealing ring 272 is bonded to the peripheral flange 262 of each of the seating rings 258. As can be observed in FIG. 6, the sealing rings 272 are disposed between the peripheral flanges 262 and the adjacent end face 218 of the valve body 202.

Operation of the embodiment of FIG. 6

The ball valve 200 is illustrated in FIG 6 as being in the open position, that is, with the port 248 in the valve ball 234 aligned with the openings 208 in the upstream connecting member 204 and the downstream connecting member 206. To close the valve 200, the operating handle 236 is rotated approximately 90°, rotating the valve operating member 224 and the valve ball 234 until the valve ball 234 is in a position substantially as illustrated in FIG. 7.

As shown in FIG. 7, fluid pressure in the opening 208 of the upstream connecting member 204 is sufficiently high to displace the valve ball 234 relatively toward the downstream connecting member 206. The downstream movement or displacement of the valve ball 234 continues until the surface 264 on the downstream seal 256 engages the end face 212 on the downstream connecting member 206. As may be realized by comparing FIGS. 6 and 7, the downstream seal 256 is displaced from the position shown in FIG. 6 until it reaches the position shown in FIG. 7. Such movement is possible due to the sliding relationship between the outer periphery 260 of the downstream seal 256 and the passageway 216 of the valve body 202.

As shown in FIG. 7, the annular seal member 268 carried in the surface 266 of the downstream seal 256 is in fluid-tight sealing engagement with the exterior surface of the valve ball 234, thereby preventing the flow of fluid from the passageway 216 therebetween into the opening 208 in the downstream connecting member 206. Also, fluid is prevented from flowing from the passageway 216 between the downstream seal 256 and the sealing ring 272 carried thereby because fluid pressure acting on the sealing ring 272, deforms it into fluid-tight sealing engagement with the flange 220 on the valve body 202. The bond between the sealing ring 272 and the seating ring 258 of the downstream seal 256 prevents fluid flow therebetween. Therefore, it can be appreciated that a fluid-tight downstream seal is formed in the ball valve 200.

It should be pointed out that the movement of the valve ball 234 is possible because the length of the rectangular recess 232 in the surface of the ball 234 is greater than the corresponding length of the rectangular lower end 230 of the valve operating member 224. The aforestated relationship is clearly shown in dash lines in FIG. 7.

Due to the location of the sealing ring 272 on the upstream seal 254, and the relative incompressibility of the material used in constructing the sealing ring 272, the upstream seal 254 does not follow the valve ball 234. As clearly shown in FIG. 7, the upstream seal 254 is out of engagement with the surface of the valve ball 234 when the valve ball 234 is displaced into sealing engagement with the downstream seal 256.

The space between the surface 266 on the upstream seal 254 and the surface of the valve ball 234 permits fluid to flow from the opening 208 in the upstream connecting member 204 into the passageway 216. However, as previously pointed out, find in the passageway 216 cannot escape into the opening 208 of the downstream connecting member 206 due to the formation of the fluid-tight seal between the valve ball 234 and the downstream seal 256.

It should also be pointed out that the space between the upstream seal 254 and the surface of the valve ball 234 prevents the development of excess pressuers in the passageway 216 that could result in damage to the ball valve 200. It is manifest in the ball valve 200 that any increase in pressure occuring in the passageway 216, due to an increase in temperature or for any other reason, will be dissipated through the space between the upstream seal 254 and the valve ball 234 into the opening 208 of the upstream connecting member 204.

Embodiment of FIG. 8

FIG. 8 is an enlarged, fragmentary cross-sectional view illsutrating the installation of another embodiment of seal in the valve 200. An annular upstream seal, designated by the reference character 300, is disposed in the valve 200 encircling the opening 208 in the upstream connecting member 204. An identical, though oppositely disposed, downstream seal 302 is disposed in the valve 200 encircling the opening 208 in the downstream connecting member 206.

Each of the seals 300 and 302 includes a seating ring 304 that is preferably constructed from a relatively rigid material. The seating rings 304 each have an outer periphery 306 sized to be slidingly disposed in the passageway 216 of the valve body 202. A surface 308 on each of the seating rings 304 is arranged to engage the end face 212 of the respective and adjacent upstream or downstream connecting member 204 or 206. Each of the seating rings 304 into includes a peripheral flange 310 that projects radially from the outer periphery 306 into the space formed between the end faces 218 of the valve body 202 and the respective upstream of downstream connecting member 204 or 206. A surface 312 on each of the seating rings 300 and 302 is configured to conform to the exterior surface of the valve ball 234 and adapted to sealingly engage the valve ball 234.

A sealing ring 314, preferably constructed from a resilient and elastic material, such as natural or synthetic rubber, is bonded to each of the peripheral flanges 310. The sealing rings 314 are disposed in sealing engagement with the end faces 212 of the upstream and downstream connecting members 204 and 206 and with the end faces 218 of the valve body 202, respectively.

It should be pointed out that the seals 300 and 302 may also be provided with resilient annular seal members, such as the seal members 268 ilustrated in FIG. 6. Furthermore, the engagement of the peripheral flanges 310 on the seating rings 304 with the valve body 202 permits the seals 300 and 302 to slide in the passageway 216 relatively toward the adjacent connecting member 204 or 206, but prevents sliding movement in the opposite direction.

*Operation of the embodiment of FIG. 8*

FIG. 8 illustrates the valve 200 having the seals 300 and 302 located therein in the open position, that is, with the port 248 in the valve ball 234 aligned with the openings 208 in the upstream and downstream connecting members 204 and 206. To close the ball valve 200, the valve ball 234 is rotated approximately 90° by rotating the operating handle 236 (see FIG. 6) until the valve ball 234 is in the position illustrated substantially in FIG. 9.

As shown in FIG. 9, the pressure in the opening 208 in the upstream connecting member 204 is sufficiently high to displace the valve ball 234 relatively toward the downstream connecting member 206. The downstream movement of the valve ball 234 and the downstream seal 302, which is carried therewith, continues until the surface 308 on the downstream seal 302 engages the end face 212 of the downstream connecting member 206.

The movement of the downstream seal 302 is possible due to the sliding relationship between the outer periphery 306 thereon and the passageway 216 of the valve body 202. Movement of the downstream seal 302 forces the sealing ring 314 thereon into tighter engagement with the end face 212 of the downstream connecting member 206, thereby forming a fluid-tight seal therewith. Thus, it can be seen that the engagement of the surface of the valve ball 234 with the surface 312 on the downstream seal 302 and the sealing engagement between the sealing ring 314 and the downstream conecting member 206 forms a fluid-tight downstream seal in the valve 200 to prevent the escape of fluid from the passageway 216 into the opening 208 in the downstream connecting member 206.

As can be observed in FIG. 9, the upstream seal 300 cannot follow the movement of the valve ball 234 due to the engagement of the peripheral flange 310 thereon with the end face 218 of the valve body 202. Since the upstream seal cannot follow the valve ball 234, a space is formed between the surface 312 on the upstream seal 300 and the surface of the valve ball 234. The space formed permits the relief of any pressure increase that might occur in the passageway 216 as described in connection with the operation of the embodiment of FIG. 6.

*Embodiment of FIG. 10*

FIG. 10 illustrates another embodiment of valve, also constructed in accordance with the invention, and generally designated by the reference character 400. While FIG. 10 is only a fragmentary cross-sectional view, it should be understood that the valve 400 includes the usual valve handle and operating members necessary to rotate a valve ball 402. As shown in FIG. 10, the valve ball 402 includes a port 404 extending therethrough as described in connection with the other embodiments of valve hereinbefore.

The valve 400 also includes a valve body 406 disposed between an upstream connecting member 408 and a downstream connecting member 410. The upstream and downstream connecting members 408 and 410 are identical to those previously described and include openings 411 extending therethrough and annular grooves 412 formed in end faces 414 and encircling the openings 411.

The valve body 406 includes a pair of end faces 416, each having an annular flange 418 projecting therefrom into the annular grooves 412 in the connecting members 408 and 410. The annular flanges 418 encircle a passageway 420 that extends through the valve body 406. The connecting members 408 and 410 are held in fluid-tight engagement with the flanges 418 of the valve body 406 by a plurality of threaded fasteners (not shown) as described in connection with the embodiment of FIG. 6. It should be pointed out that the end faces 416 in the valve body 406 are disposed relatively near the end faces 414 of the connecting members 408 and 410 and may, if desired, actually engage the end faces. However, it is preferred that some space be formed therebetween to assure that the annular flanges 418 are in fluid-tight engagement with the connecting members 408 and 410.

An annular upstream seal 422 is located in the valve 400, encircling the opening 411 in the upstream connecting member 408. An identical, though oppositely disposed, annular downstream seal 424 is located in the valve 400 encircling the opening 411 in the downstream connecting member 410.

The seals 422 and 424 each include a seating ring 426 that is preferably constructed from a relatively rigid material. Each of the seating rings 426 includes an outer periphery 428 sized to be slidably positioned in the passageway 420 in the valve body 406. A pair of spaced recesses 430 are located in each of the seating rings 426 adjacent the outer peripheries 428 for purposes that will become more apparent hereinafter. Each of the seals 422 and 424 includes a surface 432 configured to conform to the exterior of the valve ball 402 and adapted to sealingly engage the valve ball 402. A surface 434 on each of the seating rings 426 is disposed adjacent the respective end face 414 of either the upstream or downstream connecting member 408 or 410.

A pair of resilient, elastic sealing rings 436 and 438 are disposed in the recesses 430 of each of the seating rings 426. The sealing rings 436 and 438 are bonded to the seating rings 426 and are in sliding and sealing engagement with the valve body 406 in the passageway 420. As clearly shown in FIG. 10, the sealing rings 436 include an annular bead 440 on the side thereof adjacent the end faces 414 of the upstream and downstream connecting members 408 and 410, respectively.

*Operation of the embodiment of FIG. 10*

FIG. 10 illustrates the position of the valve ball 400 when it is open to fluid flow, that is, when the port 404 in the valve ball 402 is in alignment with the openings 411 in the upstream and downstream connecting members 408 and 410. To close the valve 400, the handle (not shown) is rotated, turning the valve ball 402 approximately 90° to the position illustrated in FIG. 11.

Figure 11:
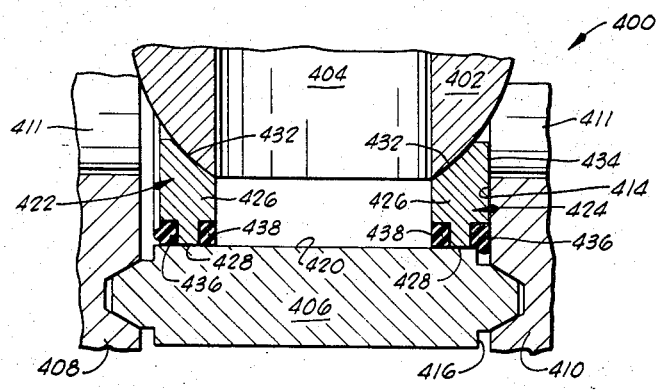
FIG. 11 is a view similar to FIG. 10 but showing the parts thereof in another operating position.

As shown in FIG. 11, fluid pressure in the opening 411 in the upstream connecting member 408 has displaced the valve ball 402 relatively toward the downstream connecting member 410. The valve ball 402 carries the downstream seal 424 therewith until the surface 434 on the seal 424 engages the end face 414 of the downstream connecting member 410 at which time the movement of the valve ball 402 and the downstream seal 424 is arrested. Fluid pressure acting on the downstream seal 424 and the valve ball 402 deforms the sealing ring 436 into engagement with the end face 414 of the downstream connecting member 410 to form a fluid-tight seal therebetween. Fluid pressure in the passageway 420, when the movement of the downstream seal 424 is arrested, exerts a force on the sealing ring 438 to force it into fluid-tight sealing engagement with the valve body 406 in the passageway 420. It can be appreciated that a fluid-tight downstream seal is formed since the surface of the valve ball is in fluid-tight sealing engagement with the surface 432 of the downstream seal 424.

As the valve ball 402 moves relatively toward the downstream connecting member 410, the upstream seal 422 follows the movement of the valve ball 402, sliding in the passageway 420, because of the pressure in the opening 411 of the upstream connecting member 408. A fluid-tight upstream seal is maintained between the upstream seal 422 and the valve body 406 due to the engagement of the surface 432 on the seating ring 426 of the upstream seal 422 with the exterior of the valve ball 402. The seal ring 436 on the seal 422 is in sealing engagement with the valve body 406 so that fluid cannot leak between the outer periphery 428 of the seating ring 426 on the upstream seal 422. Fluid pressure in the opening 411 of the connecting member 408 exerts a force on the sealing ring 436 deforming it into fluid-tight sealing engagement with the valve body 406 in the passageway 420. Thus, it can be appreciated that the seal structure described is effective to form both upstream and downstream fluid-tight seals.

Although not shown, it can also be appreciated that increasing the fluid pressure in the passageway 420 until it is greater than the fluid pressure in the opening 411 in the upstream connecting member 408 displaces the upstream seal 422 relatively toward the upstream connecting member 408 and away from the surface of the valve ball 402. The result of such displacement is to permit the escape of pressure from the passageway 420 between the surface 432 of the upstream seal 422 and the surface valve ball 402 into the opening 411 in the upstream connecting member 408. Therefore, the valve 400 and the seals 422 and 424 incorporated therein also provide a means of releasing any excess pressure that may occur in the valve body 406 to prevent damage thereto.

While each of the detailed descriptions of the various embodiments of valves has referred to the connecting members as being either upstream or downstream, it should be understood that the valves function equally well regardless of the direction that pressure is applied thereto. It should also be understood that various combinations of the foregoing seals and valve body arrangements may be made is desired.

The foregoing detailed description of the various embodiments is presented by way of example only and it should be understood that many changes and modifications can be made thereto without departing from the spirit of the invention or from the scope of the annexed claims.

What I claim is:

1. A valve for use between a pair of flanged connecting members having an annular groove in the faces thereof adjacent said valve, said valve comprising:

a valve body haing a passageway extending therethrough and a pair of end faces, each of said end faces having an annular groove therein encircling said passageway and adapted to be aligned with the grooves in the connecting members;

a valve member movably positioned in said passageway, said valve member being movable from a position opening said passageway to a position closing said passageway;

means operably connected with said valve member for moving said valve member between said open and closed positions;

a rigid, annular seal disposed in each of said annular grooves in sealing engagement with the connecting members and valve body and forming a space between each of the end faces on said valve body and each of the connecting members when said valve body is assembled therewith; and sealing means located in said valve including, a seating ring having an outer periphery sized for sliding movement in said passageway, a peripheral flange on said outer periphery extending raidally into one of said spaces, and a surface adapted to sealingly engage said valve member, and a resilient sealing ring bonded to said peripheral flange sized to sealingly engage the adjacent end face on said valve body.

2. A valve for use between a pair of flanged connecting members comprising:

a valve body having a passageway extending therethrough and a pair of end faces, each of said end faces having an annular groove therein encircling said passageway;

a valve member movably positioned in said passageway, said valve member being movable from a position opening said passageway to a position closing said passageway;

means operably connected with said valve member for moving said valve member between said open and closed positions;

a rigid, annular seal disposed in each of said annular grooves and projecting therefrom into sealingly engagement with the connecting members and forming a space between each of the end faces on said valve body and each of the connecting members when said valve body is assembled therewith; and sealing means located in said valve including, a seating ring having an outer periphery sized for sliding movement in said passageway, a peripheral flange on said outer periphery extending radially into one of said spaces, and a surface adapted to sealingly engage said valve member, and a resilient sealing ring bonded to said peripheral flange and sealingly engaging said valve body and the adjacent connecting member when said valve body is assembled therewith.

3. The valve of claim 2 wherein said sealing means includes a pair of seating rings and a pair of sealing rings with one of said seating rings and one of said sealing rings being located in said valve adjacent one of the connecting members and the other seating ring and sealing ring being located in said valve adjacent the other connecting member when said valve body is assembled between the connecting members.

4. The valve of claim 2 wherein said sealing ring is also sized to sealingly engage the adjacent rigid, annular seal.

5. A valve for use between a pair of flanged connecting members comprising:

a valve body having a passageway extending therethrough and a pair of end faces, each of said end faces having an annular groove therein encircling said passageway;

a valve member movably positioned in said passageway, said valve member being movable from a position opening said passageway to a position closing said passageway;

means operably connected with said valve member for moving said valve member between said open and closed positions;

a rigid, annular seal disposed in each of said annular grooves and projecting therefrom into sealing engagement with the connecting members and forming a space between each of said end faces and each of the connecting members when said valve body is assembled therewith; and sealing means in said valve including,
a seating ring having an outer periphery sized for sliding movement in said passageway, a peripheral flange on said outer periphery extending radially into one of said space, and a surface adapted to sealingly engage said valve member, and
a resilient sealing ring bonded to said peripheral flange and disposed between said peripheral flange and the adjacent portion of the end face on said valve body, said sealing ring being arranged to sealingly engage said valve body and rigid, annular seal.

6. A valve for use between a pair of flanged connecting members comprising:
a valve body having a passageway extending therethrough and a pair of end faces, each of said end faces having an annular flange encircling said passageway and projecting axially therefrom with respect to said passageway into sealing engagement with said connecting members when said valve body is assembled therewith;
a valve member movably disposed in said passageway, said valve member being movable from a position closing said passageway to a position opening said passageway;
means operably connected with said valve member for moving said valve member between said opened and closed positions; and
sealing means in said valve including
a seating ring having an outer periphery sized for sliding movement in said passageway, a pair of spaced, annular recesses in said outer periphery, and a surface adapted to sealingly engage said valve member,
a first resilient sealing ring disposed in the annular recess adjacent said valve member and bonded to said seating ring, said first resilient sealing ring slidingly and sealingly engaging said valve body in said passageway, and
a second resilient sealing ring disposed in the other annular recess and bonded to said seating ring, said second sealing ring slidingly and sealingly engaging said valve body in said passageway and adapted to sealingly engage the adjacent connecting member when said valve body is assembled therewith and when said valve member is in the closed position.

7. A valve for use between a pair of flanged connecting members comprising:
a valve body having a passageway extending therethrough and a pair of end faces, each of said end faces having an annular flange encircling said passageway and projecting axially therefrom to form a space between said end faces and connecting members and to sealingly engage said connecting members when said valve body is assembled therewith;
a valve member movably disposed in said passageway, said valve member being movable from a position opening said passageway to a position closing said passageway;
means operably connected with said valve member for moving said valve member between said opened and closed positions; and
sealing means disposed in said valve including
a seating ring having an outer periphery sized for sliding movement in said passageway, a peripheral flange on said outer periphery extending radially into one of said spaces, and a surface adapted to sealingly engage said valve member, and
a sealing ring bonded to said peripheral flange adapted to sealingly engage said valve body and the adjacent connecting member when said valve body is assembled therewith.

8. The valve of claim 7 wherein said sealing ring also sealingly engages the adjacent annular flange in said space.

9. The valve of claim 7 wherein said sealing means also includes a resilient annular sealing member bonded to said surface for sealingly engaging said valve member.

10. The valve of claim 7 wherein said sealing means includes a pair of seating rings and a pair of sealing rings with one of said seating rings and one of said sealing rings being located in said valve adjacent one of the connecting members and the other seating ring and sealing ring being located in said valve adjacent the other connecting member when said valve body is assembled between the connecting members.

11. A ball valve comprising:
a valve body having a passageway extending therethrough, an upstream end face, and a downstream end face, each of said end faces having an annular groove formed therein encircling said passageway;
an upstream connecting member having an opening extending therethrough and an end face having an annular groove formed therein encircling said opening;
a downstream connecting member having an opening extending therethrough and an end face having an annular groove formed therein encircling said opening;
a pair of annular seal members disposed in said annular grooves;
connecting means extending between said connecting members holding said connecting members, valve body, and seal members assembled with said openings and passageway aligned forming a flow passageway through said valve and wherein one of said seal members is disposed between each of said connecting members and valve body forming a fluid-tight seal therewith and a space therebetween;
a valve ball movably disposed in said passageway and having a port extending therethrough, said valve ball being movable from a position wherein said flow passageway is open to a position wherein said flow passageway is closed;
means operably connected with said valve ball for moving said valve ball between said opened and closed positions; and
a seal disposed in said valve, said seal including
a seating ring having an outer periphery sized for sliding movement in said passageway, a peripheral flange on said outer periphery extending radially into the space between said downstream connecting member and said valve body, a first surface adjacent said valve ball and a second surface adjacent the end face on said downstream connecting member,
an annular, elastic seal member bonded to said first surface sealingly engaging said valve ball when said valve ball is in the closed position, and
an elastic sealing ring bonded to said peripheral flange sealingly engaging the end face of said downstream connecting member when said valve ball is in the closed position.

12. The ball valve of claim 11 and also including a second seal disposed in said valve, said second seal including:

a seating ring having an outer periphery sized for sliding movement in said passageway, a peripheral flange on said outer periphery extending radially into the space between said upstream connecting member and said valve body, a first surface adjacent said valve ball, and a second surface adjacent the end face of said upstream connecting member;

an annular, elastic seal member bonded to said first surface sealingly engaging said valve ball when said valve ball is in the closed position; and, an elastic sealing ring bonded to said peripheral flange on said second seal sealingly engaging said valve body when said valve ball is in the closed position.

13. A ball valve comprising:

a valve body having a passageway extending therethrough, an upstream end face, and a downstream end face, each of said end faces having an annular flange extending axially therefrom relative to said passageway and encircling said passageway;

an upstream connecting member having an opening extending therethrough and an end face having an annular groove formed therein encircling said opening;

a downstream connecting member having an opening extending therethrough and an end face having an annular groove formed therein encircling said opening;

connecting means extending between said connecting members holding said connecting members and valve body assembled with said openings and passageway aligned to form a flow passageway through said valve and with said annular flanges disposed in said annular grooves forming a fluid-tight seal between said connecting members and valve body and forming a pair of spaces therebetween;

a valve ball movably disposed in said passageway and having a port extending therethrough, said valve ball being movable from a position wherein said flow passageway is open to a position wherein said flow passageway is closed;

means operably connected with said valve ball for moving said valve ball between said opened and closed positions; and a seal disposed in said valve, said seal including a seating ring having an outer periphery sized for sliding movement in said passageway, a peripheral flange on said outer periphery extending radially into the space between said downstream connecting member and said valve body, a first surface adjacent said valve ball and a second surface adjacent the end face on said downstream connecting member, an annular, elastic seal member bonded to said first surface sealingly engaging said valve ball when said valve ball is in the closed position, and an elastic sealing ring bonded to said peripheral flange sealingly engaging the end face of said downstream connecting member when said valve ball is in the closed position.

14. The ball valve of claim 13 and also including a second seal disposed in said valve, said second seal including:

a seating ring having an outer periphery sized for sliding movement in said passageway, a peripheral flange on said outer periphery extending radially into the space between said upstream connecting member and said valve body, a first surface adjacent said valve ball, and a second surface adjacent the end face of said upstream connecting member;

an annular, elastic seal member bonded to said first surface sealingly engaging said valve ball when said valve ball is in the closed position; and an elastic sealing ring bonded to said peripheral flange on said second seal sealingly engaging said valve body when said valve ball is in the closed position.

References Cited

UNITED STATES PATENTS

| | | | |
|---|---|---|---|
| 1,992,503 | 2/1935 | Penick | 285—368 |
| 2,148,863 | 2/1939 | Key | 285—368 |
| 2,985,421 | 5/1961 | Anderson | 251—172 |
| 3,056,577 | 10/1962 | Kulisek | 251—317 |
| 3,202,175 | 8/1965 | Dumm | 251—315 |

M. CARY NELSON, *Primary Examiner.*

W. R. CLINE, *Assistant Examiner.*